United States Patent
Iwasa et al.

(10) Patent No.: US 6,341,901 B1
(45) Date of Patent: Jan. 29, 2002

(54) PHOTOGRAPHING LENS OF A CAMERA HAVING A MASK FOR BLOCKING OFF NOISE LIGHT WHICH GENERATES IN RELATION TO A NON-CIRCULAR LENS

(75) Inventors: Kazuyuki Iwasa, Hino; Mitsuhiro Sato, Hachioji; Shinichi Kodama, Hino, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/299,431

(22) Filed: Apr. 26, 1999

(30) Foreign Application Priority Data

Apr. 28, 1998 (JP) .............................. 10-119164

(51) Int. Cl.[7] .......................... G03B 17/00; G03B 9/00; G02B 7/02
(52) U.S. Cl. ...................... 396/355; 396/529; 359/739; 359/740; 359/811; 359/819
(58) Field of Search ................. 396/355, 529, 396/505, 507; 359/601, 611, 722, 738, 739, 740, 676, 811, 819

(56) References Cited

U.S. PATENT DOCUMENTS

| 5,220,460 A | * | 6/1993 | Bedzyk ....................... 359/813 |
| 5,313,329 A | * | 5/1994 | Ueda ........................... 359/676 |
| 5,461,444 A | * | 10/1995 | Okura et al. ................. 396/529 |
| 5,680,260 A | * | 10/1997 | Farcella et al. ............. 359/819 |
| 5,748,390 A | * | 5/1998 | Koiwai et al. .............. 359/811 |
| 5,978,160 A | * | 11/1999 | Koiwai et al. .............. 359/822 |

FOREIGN PATENT DOCUMENTS

| JP | 5-11116 | 2/1993 |
| JP | 9-197237 | 7/1997 |

* cited by examiner

*Primary Examiner*—Alan A. Mathews
(74) *Attorney, Agent, or Firm*—Frishauf, Holtz, Goodman, Langer & Chick, P.C.

(57) ABSTRACT

A photographing lens of a camera comprises a non-circular lens and a light blocking mask. The non-circular lens receives an optical image from an object and forms an image on a photographing medium. The light blocking mask is fixed in front of the non-circular lens, and blocks noise light generated in relation to the non-circular lens.

8 Claims, 3 Drawing Sheets

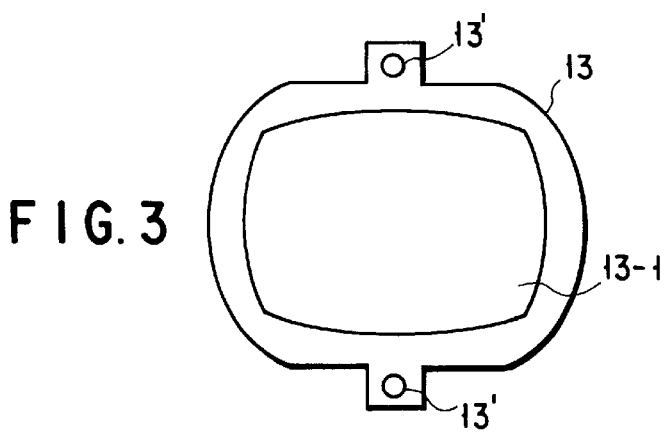
FIG. 3
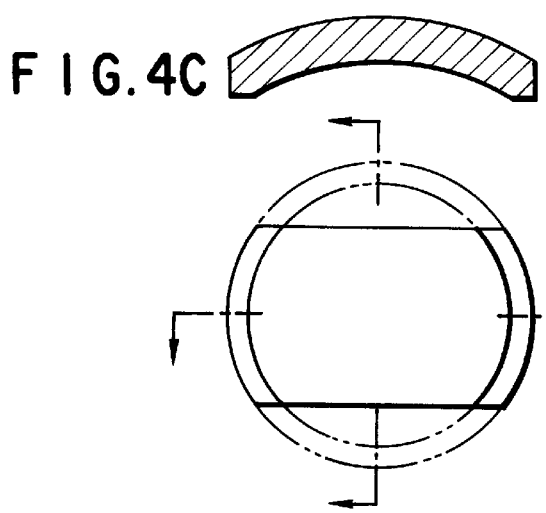
FIG. 4C
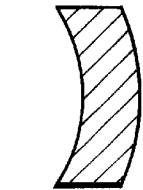
FIG. 4B
FIG. 4A
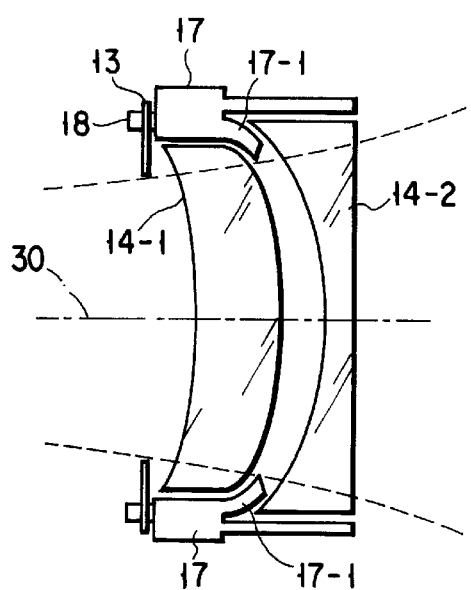
FIG. 5

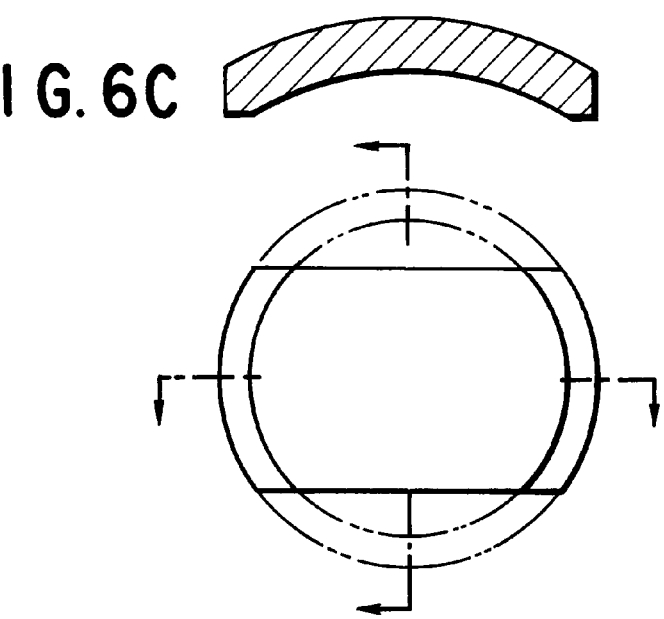
FIG. 6C
FIG. 6B
FIG. 6A
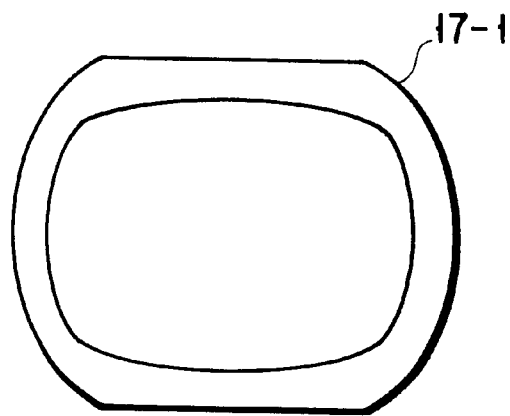
FIG. 7

PHOTOGRAPHING LENS OF A CAMERA HAVING A MASK FOR BLOCKING OFF NOISE LIGHT WHICH GENERATES IN RELATION TO A NON-CIRCULAR LENS

BACKGROUND OF THE INVENTION

The present invention relates to a photographing lens of a camera, particularly to a photographing lens having a light blocking mask located in front of a non-circular lens which receives an optical image from an object and forms an image on a photographing medium.

Conventionally, a compact camera is known, in which a part of a photographing lens is cut and other components are mounted in the cut portion.

For example, Jpn. UM Appln. KOKAI publication No. 5-11116 discloses a compact lens barrel in which upper and lower portions of a photographing lens are cut and an auxiliary optical unit is incorporated in the cut portion.

Further, Jpn. Pat. Appln. KOKAI Publication No. 9-197237 discloses that upper and lower portions of a photographing lens are cut and a supporting member is provided in the cut portion, so that a compact photographing lens can be obtained.

However, as regards the lenses of the cameras described above, since the distance between the optical axis of the photographing lens and the vertex of the lens is reduced by cutting a part of the lens, noise light is generated in relation to the cut portion. The noise light is transmitted to a film and adversely influences the formation of an image on the film.

BRIEF SUMMARY OF THE INVENTION

It is accordingly an object of the present invention to provide a photographing lens of a camera which can block off noise light generated in relation to a cut portion of the lens, so that the formation of an image cannot be adversely influenced.

To achieve the above object, according to a first aspect of the present invention, there is provided a photographing lens of a camera, comprising:
- a non-circular lens for receiving an optical image from an object and forming an image on a photographing medium; and
- a light blocking mask, fixed in front of the non-circular lens, for blocking noise light generated in relation to the non-circular lens.

According to a second aspect of the present invention, there is provided a photographing lens of a camera, comprising:
- a cut lens obtained by cutting off a portion of a circular lens at a position of a predetermined height from an optical axis of the circular lens; and
- a light blocking mask arranged immediately in front of the cut lens and having an opening which allows passage of an effective photographing light beam from an object, a distance between the optical axis and a side defining the opening in a height direction being smaller than a distance between the optical axis and the cut portion of the cut lens.

According to a third aspect of the present invention, there is provided a photographing lens of a camera, comprising:
- a cut lens of an oval shape covering a region which allows passage of an effective photographing light beam effective for an imaging screen of a rectangular film; and
- a light blocking mask arranged immediately in front of the cut lens and having an opening of an oval shape smaller than the cut lens.

According to a fourth aspect of the present invention, there is provided a photographing lens of a camera, comprising:
- a cut lens obtained by cutting a portion of an external form of a circular lens along a chord at a predetermined height from a lens optical axis; and
- a light blocking mask arranged immediately in front of the cut lens and having an opening which allows passage of an effective photographing light beam from an object, a distance between the lens optical axis and a side defining the opening in a height direction being smaller than a distance between the lens optical axis and the cut portion.

According to a fifth aspect of the present invention, there is provided a photographing lens of a camera, comprising:
- a cut lens, obtained by cutting peripheral portions of a circular lens along two parallel lines at same distance from a center of an optical axis, for transmitting a light beam from an object to at least a rectangular effective recording region of an image recording medium and forming an image of the object on the effective recording region; and
- a stray light stopper, arranged in proximity to the cut lens and having an opening reduced from an external form of the cut lens, for preventing harmful reflection light generated in the cut portions of the cut lens from reaching the effective recording region.

According to a sixth aspect of the present invention, there is provided a photographing lens apparatus comprising:
- a non-circular lens upper and lower portions of an external circumference of which are cut off parallel with a horizontal line; and
- a diaphragm type member upper and lower portions of an external form of which are cut off parallel with a horizontal line, and having an opening which allows passage of photographing-light,
- wherein the diaphragm type member blocks off the photographing light above and below the opening.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram showing a shape of the light blocking mask 13;

FIGS. 4A, 4B and 4C are diagrams showing a shape of a front lens 14-1, wherein FIG. 4A is a front view, FIG. 4B is a longitudinal cross-sectional view and FIG. 4C is a lateral cross-sectional view;

FIG. 5 is a diagram showing details around a light blocking mask 13 and a third group lens 14 according to a second embodiment of the present invention;

FIGS. 6A, 6B and 6C are diagrams showing a shape of a rear lens 14-2, wherein FIG. 6A is a front view, FIG. 6B is a longitudinal cross-sectional view and FIG. 6C is a lateral cross-sectional view; and FIG. 7 is a diagram showing a shape of a light blocking mask 17-1.

DETAILED DESCRIPTION OF THE INVENTION

Figure 1:
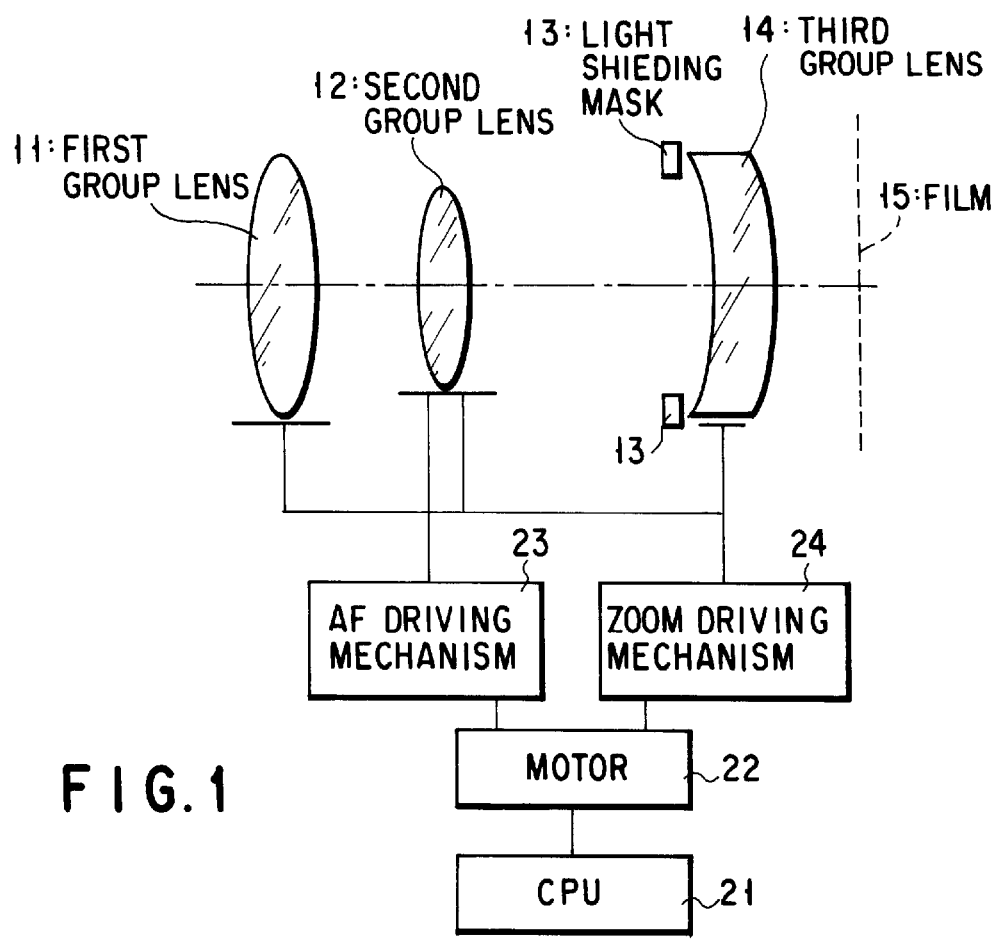
FIG. 1 is a schematic diagram showing a photographing optical system of a camera to which a photographing lens of the present invention is applied.

Embodiments of the present invention will be described in detail with reference to the accompanying drawings. FIG. 1 is a schematic drawing showing a photographing optical system of a camera to which a photographing lens of the present invention is applied. The optical system includes a first group lens 11, a second group lens 12, a third group lens 14 and a film 15 arranged in this order along the path of an optical image reflected from an object. The third group lens 14 is a D cut lens (non-circular lens) obtained by cutting off upper and lower portions of a circular lens along predetermined chords, so as to leave only the portion through which an effective photographing light beam from the object passes. A light blocking mask 13 is provided immediately in front of the third group lens 14. Noise light (stray light or harmful reflection light) is generated in relation to the cut portions because of the short distance between the optical axis of the photographing lens and the lens vertex, sine the portions of the photographing lens are cut. The light blocking mask 13 serves as a stopper for preventing the noise light from reaching the film and exerting an adverse influence on image formation on the film. The light blocking mask 13 also functions as a diaphragm type member.

In the lens structure described above, when focus is adjusted, an AF driving mechanism 23 is driven by a motor 22 under the control of a CPU 21 to move the second group lens 12, so that proper focus can be achieved. When the magnification is changed, a zoom driving mechanism 24 is driven by the motor 22 under the control of the CPU 21 to move all the first, second and third group lenses 11, 12 and 14, thereby zooming the lenses. A shutter mechanism is incorporated in the second group lens 12.

Figure 2:
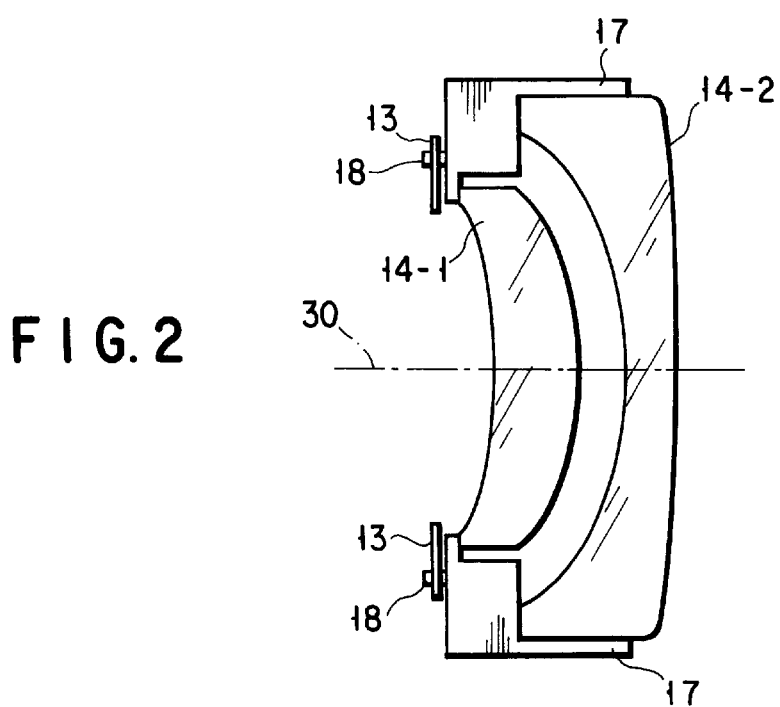
FIG. 2 is a diagram showing details around a light blocking mask 13 and a third group lens 14 according to a first embodiment of the present invention.

FIG. 2 is a diagram showing details around the light blocking mask 13 and the third group lens 14 according to a first embodiment of the present invention. FIG. 3 is a diagram showing a shape of the light blocking mask 13. FIGS. 4A, 4B and 4C are diagrams showing a shape of a front lens 14-1, wherein FIG. 4A is a front view, FIG. 4B is a longitudinal cross-sectional view and FIG. 4C is a lateral cross-sectional view. The third group lens 14 comprises a front lens 14-1 and a rear lens 14-2. The front lens 14-1 is a D cut lens having an oval shape, obtained by cutting off upper and lower portions of a circular lens. The lens surface of the front lens 14-1 on the object side is concave. The rear lens 14-2 is a circular lens, whose lens surface on the object side is concave.

As shown in FIG. 2, arc portions of the front lens 14-1 are adhered to a front stage portion of a supporting member 17, and the rear lens 14-2 is adhered to a large diameter portion of the supporting member 17 (an adhesive is not shown). Bosses 18, for positioning the light blocking mask 13 in the lateral directions, are provided on the front surface of the supporting member 17. Openings 13' of the light blocking mask 13 are fitted to the bosses 18 and the mask 13 is adhered to the supporting member 17 by an adhesive, such as double-faced adhesive tape. Thus, the light blocking mask 13 is fixed to the supporting member 17.

As shown in FIG. 3, the light blocking mask 13 is flat and has an opening 13-1 which allows passage of an effective photographing light beam from the object. The distance between the optical axis of the lens and a side defining the opening 13-1 in the height direction is smaller than the distance between the optical axis of the lens and the cut portion of the front lens 14-1.

FIG. 5 is a diagram showing details around a light blocking mask 13 and a third group lens 14 according to a second embodiment of the present invention. In the second embodiment, unlike in the first embodiment, a rear lens 14-2 is not a circular lens, but a D cut lens upper and lower portions of which are cut off. This embodiment is applicable to a case in which both the front lens and the rear lens are D cut lenses, so that the lens structure can be more compact as compared to the first embodiment. The rear lens 14-2 is positioned within and supported by the holding member 17 at arc portions of the lens which are not cut off.

FIGS. 6A, 6B and 6C are diagrams showing a shape of a rear lens 14-2, wherein FIG. 6A is a front view, FIG. 6B is a longitudinal cross-sectional view and FIG. 6C is a lateral cross-sectional view. The second embodiment includes a second light blocking mask 17-1, which is obtained by deforming the supporting member 17 so that noise light generated due to the shape of the rear lens 14-2 may not be transmitted to the side of the film 15.

FIG. 7 shows a shape of the light blocking mask 17-1, having a non-planar form curved at the same curvature as that of the lens surface of the rear lens 14-2.

According to the first and second embodiments described above, since the light blocking mask is provided to block noise light generated in relation to the cut portions of the lens, the noise light is prevented from being transmitted to the film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photographing optical system comprising:

first and second cut lenses obtained by cutting peripheral portions of respective circular lenses along two parallel lines at a same distance from a center of an optical axis;

a stray light stopper arranged in proximity to one of the first and second cut lenses; and a supporting member that supports the first and second cut lenses and the stray light stopper;

wherein the supporting member comprises a light blocking member distinct from the stray light stopper; and wherein the stray light stopper and the light blocking member remove respective noise light generated by the first and second cut lenses.

2. A photographing optical system according to claim 1, wherein the light blocking member is located between the first and second cut lenses and is curved along an optical surface of the second cut lens.

3. A photographing optical system comprising:

a cut lens obtained by cutting peripheral portions of a circular lens along two parallel lines at a same distance from a center of an optical axis, said cut lens having a spherical optical surface; and a light blocking member having a curved surface that is curved along the spherical optical surface of the cut lens in a same direction of curvature as said spherical optical surface.

4. A photographing optical system according to claim 3, further comprising:

a supporting member that supports a plurality of lenses including the cut lens; and a stray light stopper distinct from the light blocking member;

wherein the stray light stopper is also supported by the supporting member; and wherein the light blocking member and the supporting member are integrally formed as a single unit.

5. A photographing optical system comprising:

a cut lens having an oval shape covering a region which allows passage of a photographing light beam that is effective for enabling a rectangular object to be photographed, said cut lens having a spherical optical surface; and a light blocking member arranged immediately in front of the cut lens;

wherein the light blocking member comprises an opening smaller than the cut lens; and wherein the light blocking member has a curved surface that is curved along the spherical optical surface of the cut lens in a same direction of curvature as said spherical optical surface.

6. A photographing optical system according to claim 5, further comprising:

a supporting member that supports a plurality of lenses including the cut lens; and a stray light stopper distinct from the light blocking member;

wherein the stray light stopper is also supported by the supporting member; and wherein the light blocking member and the supporting member are integrally formed as a single unit.

7. A photographing optical system comprising:

a non-circular lens obtained by removing at least a part of an unnecessary portion of a photographing light beam, said non-circular lens having a spherical optical surface; and a light blocking member that prevents light generated at a non-circular portion of the non-circular lens from being transmitted to a photographing medium;

wherein the light blocking member has a curved surface that is curved along the curved optical surface of the non-circular lens in a same direction of curvature as said spherical optical surface.

8. A photographing optical system according to claim 7, further comprising:

a lens supporting member that supports the non-circular lens;

an additional lens that is also supported by the lens supporting member; and a stray light stopper distinct from the light blocking member;

wherein said stray light stopper is arranged immediately in front of the additional lens.

* * * * *